(12) United States Patent
Yardumian et al.

(10) Patent No.: US 6,992,782 B1
(45) Date of Patent: Jan. 31, 2006

(54) SCALABLE VECTOR GRAPHICS PRINT DRIVER

(75) Inventors: Richard Krikor Yardumian, Orange, CA (US); William Zhang, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 763 days.

(21) Appl. No.: 09/661,387

(22) Filed: Sep. 13, 2000

(51) Int. Cl.
*G06F 15/00* (2006.01)

(52) U.S. Cl. .................. 358/1.13; 358/1.9; 358/442

(58) Field of Classification Search ............... 358/1.2, 358/2.1, 1.15, 1.18, 462, 464, 299, 1.1, 1.9, 358/1.13, 401, 442, 452; 382/295, 298
See application file for complete search history.

(56) References Cited

U.S. PATENT DOCUMENTS

| | | | |
|---|---|---|---|
| 5,867,633 A | 2/1999 | Taylor, III et al. ......... 395/109 |
| 5,991,822 A | 11/1999 | Mealey et al. .............. 709/301 |
| 6,003,069 A | 12/1999 | Cavill ...................... 709/205 |
| 6,426,798 B1 * | 7/2002 | Yeung ....................... 358/1.13 |
| 6,430,321 B1 * | 8/2002 | Choo ........................ 382/299 |
| 6,560,621 B2 * | 5/2003 | Barile ....................... 715/513 |
| 6,597,471 B1 * | 7/2003 | Yoshikawa ................. 358/1.2 |
| 6,678,072 B1 * | 1/2004 | Matsuoka et al. .......... 358/2.1 |
| 2002/0059265 A1 * | 5/2002 | Valorose, III .............. 707/100 |

OTHER PUBLICATIONS

"rfc2397-DataScheme", L. Masinter, Xerox Corporation, Aug. 1998, 7 pages.
"Adobe Updates Illustrator", InternetNews.com (visited Jun. 2, 2000), http://www.internetnews.com/wd-news/print/0,,10_386221,00.html, 1 page.
"Steady State Home Page", SteadyState.com (last modified Jul. 30, 2000), http://www.steadystate.com, 4 pages.

* cited by examiner

*Primary Examiner*—Mark Wallerson
(74) *Attorney, Agent, or Firm*—Fitzpatrick, Cella, Harper & Scinto

(57) ABSTRACT

The present invention addresses the foregoing problems and concerns a print driver executable on a user's personal computer and responsive to a print option selection from any application program, generates output that conforms to a standardized markup language format.

22 Claims, 8 Drawing Sheets

SCALABLE VECTOR GRAPHICS PRINT DRIVER

BACKGROUND OF THE INVENTION

1. Field of the Invention

The present invention relates to a print driver, and more particularly, to a print driver capable of generating output conforming to the SVG (Scalable Vector Graphics) standard.

2. Description of the Related Art

Printers are typically interfaced to a client device, such as a computer, through a software module commonly referred to as a print driver. A print driver is generally accessible from within an application program (e.g., Microsoft Word and Excel or Corel WordPerfect) and converts output from an application program (e.g., GDI or Graphic Device Interface) into a format (or language) that a printer understands. Examples of such a format, or printer language, include PostScript from Adobe and PCL (Printer Control Language) from Hewlett Packard.

While current print driver output may be used to generate output for printing by a printer, such output is unsuitable for display. To display the print output generated by the print driver, the print output must be converted to a suitable display format, or existing applications must be altered to include the ability to generate a display using the print output. In a display environment, such conversion or generation may result in unacceptable response times (i.e., the time it takes to provide display output in response to input). Further, since there are multiple print output formats, several different conversion or generation programs, or one large program that incorporates each, is needed.

In addition, like a programming language, a printer language (e.g., PostScript) has a specific syntax and requires an interpreter to interpret the output generated by the print driver. Typically, such print output consists of several lines of "code" which results in a print output file being quite large. This is disadvantageous where, for example, the output is to be sent over a communications network (e.g., the World Wide Web).

Further, many applications, such as browser applications, are not designed to generate display output using print output. For example, most browser applications are designed to generate a display page of data, typically received via the World Wide Web, that has a display format. For example, most browsers are able to understand a markup language format such as Hypertext Markup Language (HTML).

A markup language, such as HTML, defines a set of data elements and their corresponding attributes as well as a hierarchical structure that allows some data elements to be defined within other data element definitions in an HTML-defined document. Other hierarchical languages that are used to define display data include the XML (Extensible Markup Language) and SVG (Scalable Vector Graphics) languages. However, these markup, or hierarchical, languages have traditionally been limited to defining display data.

There is currently no ability to generate output that conforms to a single, standardized format (or language) where the output can be both displayed and printed.

Thus, it would be beneficial to have the ability to generate print output that conforms to a standard format that is able to be both printed and displayed.

SUMMARY OF THE INVENTION

The present invention addresses the foregoing problems and concerns a print driver executable on a user's personal computer and responsive to a print option selection from any application program, that is able to generate output that conforms to a standardized markup language format.

Advantages of the foregoing features include the ability to both display and print output generated by the print driver. Further, since a standardized format is used, it is not necessary for display and print devices to have the ability to understand multiple formats to be able to process the print output.

Accordingly, in one aspect of the invention, a print driver which is executable on a user's personal computer and responsive to a selection of a print option from any application program is provided and comprises computer-executable code configured to receive output from an application program, and computer-executable code configured to generate print output from the application program output, the print output conforming to a standardized markup language.

In another aspect of the invention, a printer is provided that comprises computer-executable code configured to receive print output conforming to a standardized markup language, and computer-executable code configured to produce a print image using the print output.

An example of a standardized markup language that may be used with aspects of the present invention is the scalable vector graphics (SVG) format.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 1:
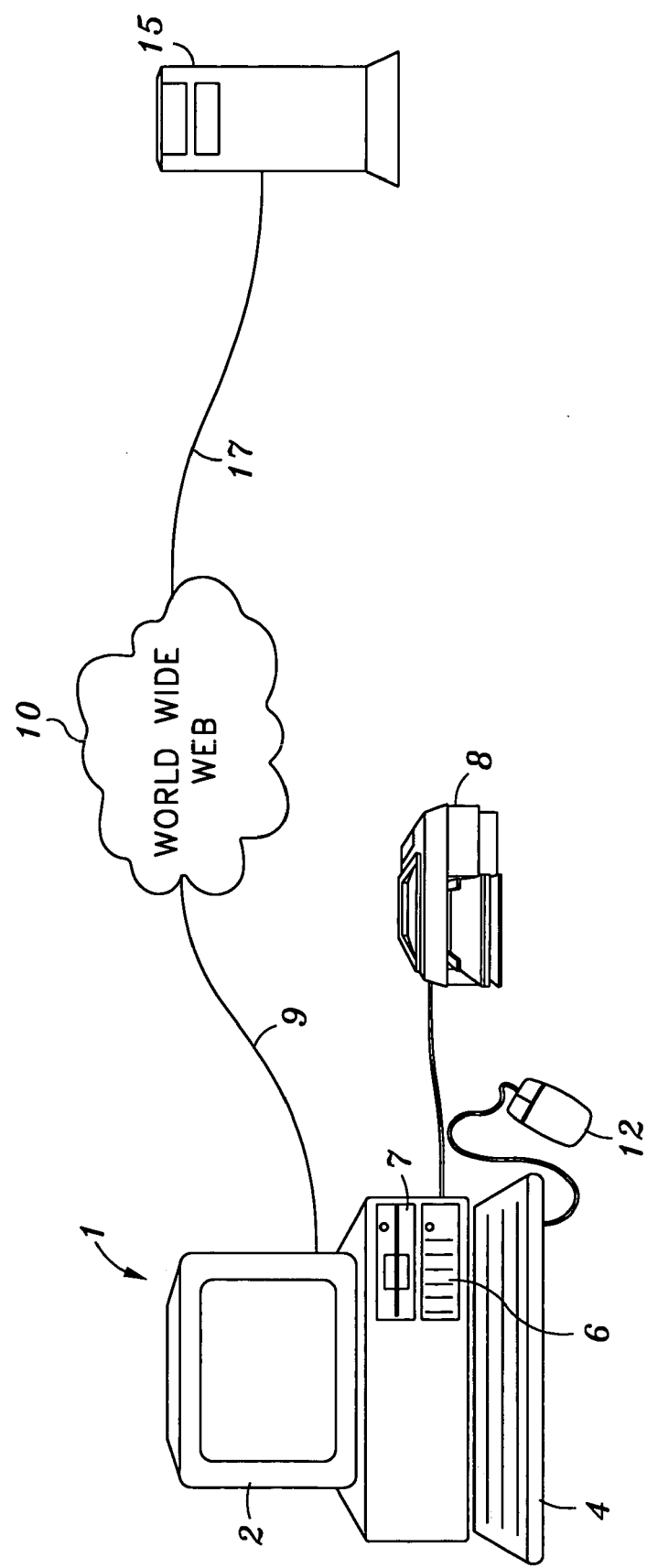
FIG. 1 is an outward view of a hardware environment embodying the present invention.

FIG. 1 is an outward view of representative computing hardware embodying the present invention. Shown in FIG. 1 are computer 1 executing a browser-enabled operating system, such as Microsoft Windows NT® or Windows98®, display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, such as a World Wide Web browser application, data files, and device drivers for controlling peripheral devices attached to computer 1, floppy disk drive 7 for use in reading data from and writing data to floppy disks inserted therein. Data and/or applications may also be accessed from a CD-ROM via a CD-ROM drive (not shown) or over a network to which computer 1 may be connected (network connection not shown).

Computer 1 further includes a connection 17 to World Wide Web 10. While the invention is described with reference to the World Wide Web 10 (also referred to as the Internet), it should be apparent that the invention may be practiced with other types of networks such as an intranet, local area network, etc. Connection 17 may be formed, for example, via a serial modem (not shown) connected to computer 1 and a telephone line which, in turn, is connected to World Wide Web 10. It should be noted that computer 1 may be connected to World Wide Web 10 by other types of connections. By executing a web browser application, web pages and data can be received from World Wide Web 10 over connection 17 for display on monitor 2 and/or use by computer 1.

Also connected to World Wide Web 10, via a connection 17, is web server 15, which receives requests for web pages and/or data from such web browsers and/or other applications running on a client device such as computer 1 and sends the pages and/or data to a requesting application over World Wide Web 10. It should be apparent while only one server 15 is shown in FIG. 1, additional instances of server 15 may be used to store and reproduce data as described herein.

Web server 15 includes program code configured to receive requests and send responses to the requesting application to assist a user of computer 1 or other device to transfer web publishing documents to and from a client computer system such as computer 1.

Like computer 1, web server 15 is a computing system that is preferably executing a browser-enabled operating system, such as Microsoft® Windows, and may include a display monitor 2, keyboard 4 for entering text and commands and mouse 5 for manipulating and for selecting objects displayed on display monitor 2. Web server 15 further includes one or more disk drives (e.g., fixed disk drive 6, floppy disk drive 7 and/or a CD-ROM drive), in which are stored reproduction data, application programs, other data and files, and device drivers for controlling peripheral devices.

A floppy disk drive, such as floppy disk drive 7 may be used to read data from and write data to floppy disks inserted therein. Data and/or applications may also be accessed from a CD-ROM via a CD-ROM drive (not shown) or over a network to which web server 15 may be connected (network connection not shown).

Web server 15 is connected to World Wide Web 10 via connection 17 which may be a serial modem or other interface (e.g., ethernet card) to connect directly or, indirectly, to the World Wide Web (or other communications network such as local or wide area networks). Connection 17 may be, for example, a telephone line, a T1 line, a local area network connection or the like. In a case that connection 17 connects directly to a local area network, the local area network is preferably connected to a router (not shown), which, in turn, is connected to World Wide Web 10. In such a configuration, the router includes firewall software for prevention of unauthorized access to the local area network.

Figure 2:
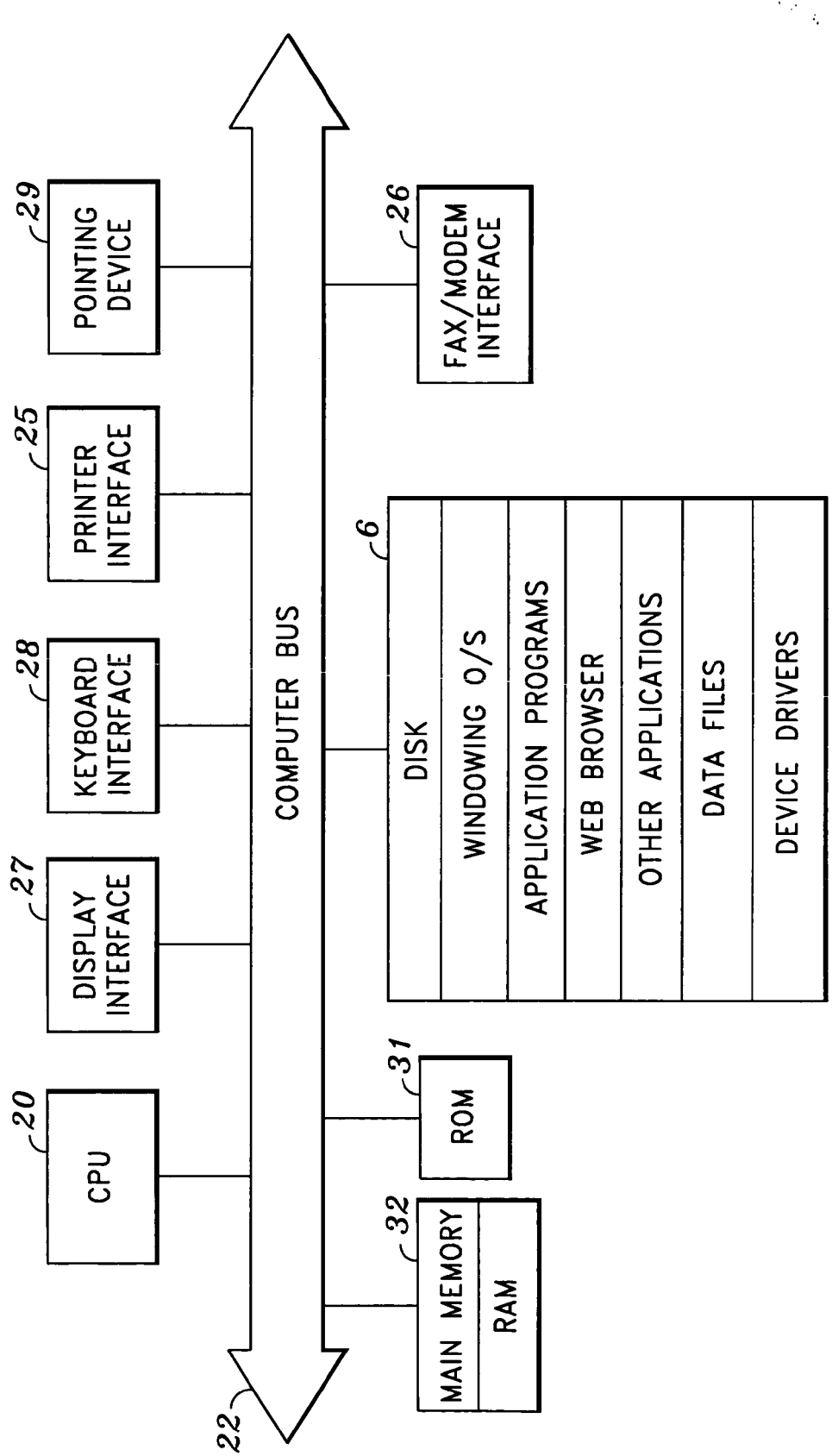
FIG. 2 is a block diagram of the internal architecture of a personal computer for use in conjunction with the present invention.

FIG. 2 is a block diagram of the internal architecture of computer 1. Shown in FIG. 2 are CPU 20, which is preferably a Pentium-type microprocessor, interfaced to computer bus 22. Also interfaced to computer bus 22 are printer interface 25, to allow computer 1 to communicate with printer 8, modem interface 26 to enable communications between computer 1 and its internal modem, display interface 27 for interfacing with display monitor 2, keyboard interface 28 for interfacing with keyboard 4, and mouse interface 29 for interfacing with mouse 5. Of course, if computer 1 connects to World Wide Web 10 by a connection other than a telephone connection, a suitable interface other than modem interface 29 may be utilized.

Read only memory (ROM) 31 stores invariant computer-executable process steps for basic system functions such as basic I/O, start up, or reception of keystrokes from keyboard 4.

Main random access memory (RAM) 32 provides CPU 20 with memory storage which can be accessed quickly. In this regard, computer-executable process steps of a web browser or other application are transferred from disk 6 over computer bus 22 to RAM 32 and executed therefrom by CPU 20.

Also shown in FIG. 2 is disk 6 which, as described above, includes a windowing operating system, a web browser executable on the particular windowing operating system, as well as applications such as word processing, spreadsheet, graphics, gaming applications. Disk 6 further includes data files and device drivers as shown. In particular, disk 6 includes the print driver of the present invention.

Web server 15 has a similar internal architecture to that of computer 1. In addition to that described, web server 15 and computer 1 may further include a network communications layer, or TCP/IP layer, that supports the TCP/IP protocol, for establishing a reliable connection between processes and routing datagrams via one or more physical networks. The TCP/IP provides support for a suite of protocols which include the HTTP (Hypertext Transport Protocol) which is used to transmit HTML (Hypertext Markup Language) documents, FTP (File Transfer Protocol) used for file transfer, SMTP (Simple Mail Transfer Protocol) which provides a messaging system for electronic mail, and the Telnet protocol which provides terminal emulation. Other applications and/or protocols may make use TCP/IP to route data reliably via a physical network (or networks).

According to one aspect of the invention, a print driver is provided for use with any application to generate print output, email output and/or web publishing output from within the application. The format of the output that is generated by the print driver is suitable for both display and printout.

Another aspect of the present invention recites a print driver is which is executable on a user's personal computer and responsive to a selection of a print option from any application program is provided and comprises computer-executable code configured to receive output from an application program, and computer-executable code configured to generate print output from the application program output, the print output conforming to a standardized markup language.

Preferably, an SVG (Scalable Vector Graphics) output format is used with the present invention. The SVG standard is described in a document entitled "Scalable Vector Graphics (SVG) 1.0 Specification" which is available from the World Wide Web Consortium and is incorporated herein by reference.

However, it should be apparent that other output formats such as Adobe PDF (Portable Document Format) and PostScript may also be used with the present invention.

In contrast to formats such as the PDF and PostScript formats, SVG is a standardized markup language that defines a set of data elements and their corresponding attributes as well as a hierarchical structure that allows some data elements to be defined within other data element definitions. As such SVG provides advantages over other formats, including PDF and PostScript formats. An interpreter used in displaying or printing output that conforms to the SVG format is less complex. Like a traditional programming language, the PDF and PostScript languages use a complex syntax which results in an interpreter that must parse and interpret the complex syntax. In contrast, since SVG uses a simpler markup language syntax, a less complex interpreter may be used to parse and interpret SVG-formatted output.

Figure 3:
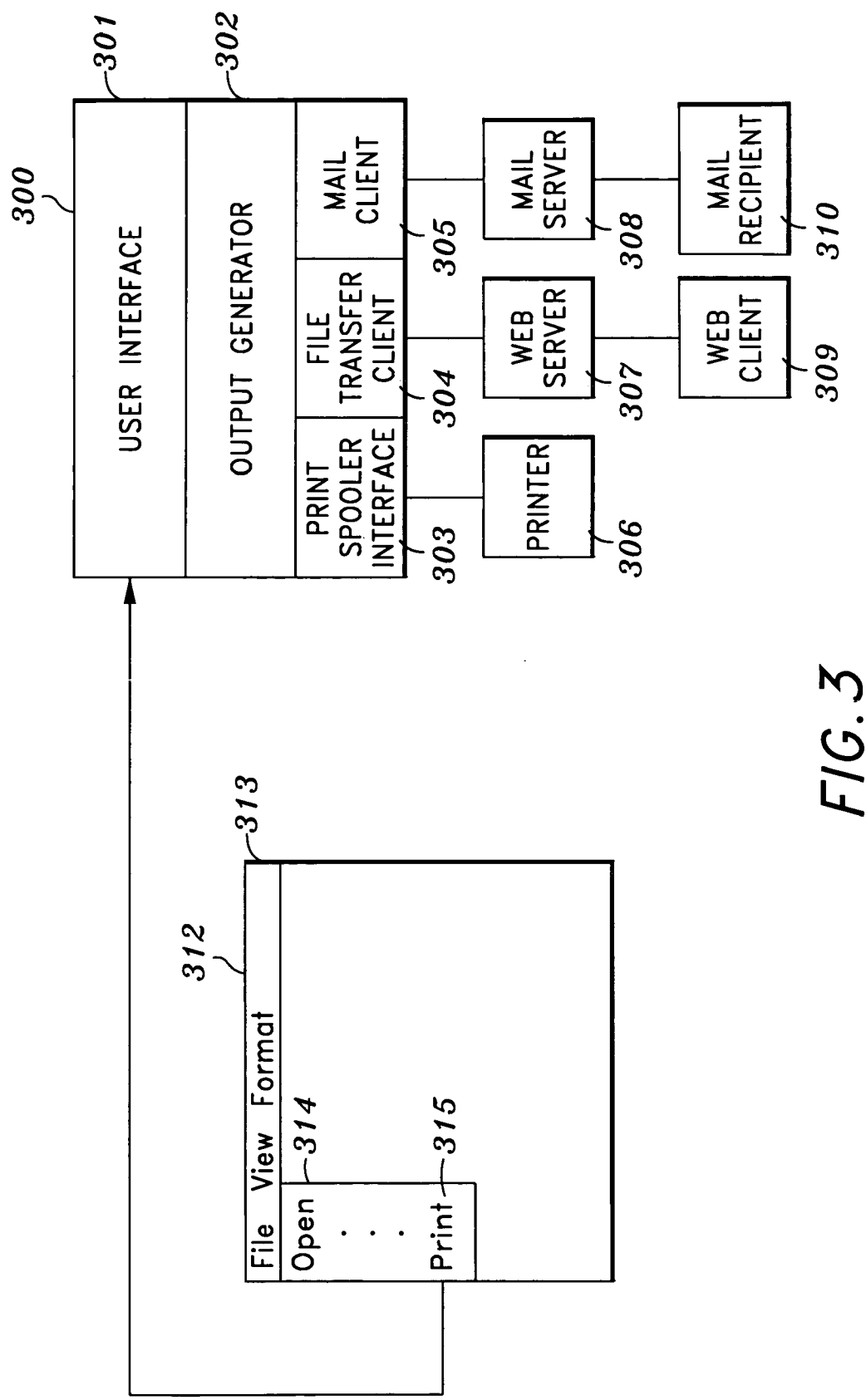
FIG. 3 provides an overview of an architecture of a multi-purpose print driver according to the present invention.

The present invention is described herein with reference to the Microsoft® Windows operating system (or windows environment). However, it should be apparent that the present invention may be used with other windowing, or operating, environments. FIG. 3 provides an overview of an architecture of a multi-purpose print driver according to the present invention.

When a user executes an application in a windows environment, at least one application window is opened in which the user may supply input (e.g., keyboard, mouse, etc. input) to the application. In addition, the application window includes commands that may be selected from a command line. Referring to application window 312, for example, command line 312 includes command line 313 that includes file, view, format, etc. menu selections which when one is selected cause a menu of commands to be displayed. Command menu 314 is displayed when the file menu is selected, for example. From within command menu 314, an application user can choose to print application data by selecting print command 315.

The selection of print command 315 causes user interface (UI) 301 to be displayed allowing the user to make selections and provide information associated with a print request. According to the present invention, the user has the option of printing application data to a printer (e.g., printer 306), transferring application data to web server 307 and/or mailing application data to one or more recipients via mail server 308.

Application data received by print driver 300 is converted to an output format (e.g., PostScript, PDF, SVG, etc.) by output generator 302. As is discussed in more detail below with reference to Microsoft's windows environment, application data is supplied to a print driver via a graphics device interface (GDI) and GDI commands. In such a case, output generator 302 converts GDI commands to an output format.

If the application user selects output to a printer using UI 301, the output of output generator 302 is spooled, using print spooler interface 303, for printing by printer 306 (e.g., a default printer or other user-specified printer). Printer 306 generates printed image output from the output generated by output generator 302.

In a case that an application user wishes to publish application data on the web, the output of output generator 302 is supplied to file transfer client 304 for transfer to web server 307. Thereafter, it is available for retrieval or download by web client 309 for print and/or display. For example, web client 309 may be executing browser software in which the web publishing output may be displayed. Alternatively, web client 309 may retrieve the web publishing output for printout. It should be apparent that the web publishing output may be viewed or printed by any web client 309 which has a capability to interpret the contents of the web publishing output.

In a case that application data is to be electronically mailed, output generated by print driver 300 in response to an application user's selection is transmitted via mail client 305 to mail server 308 and forwarded to mail recipient (or recipients) 310.

The process by which application data is published on the web for web client 309 via web server 307, and/or electronically mailed via mail server 308 to web client 309 is described in more detail below. Web client 309 and/or mail recipient 308 may be, for example, a computing system such as computer 1 or web server 15, or may be a computing system that is embedded in a display device (e.g., an intelligent display) and/or a print device such as printer 306. Further, it should be apparent that other print or display devices may be used with the present invention including a copier (e.g., a digital copier or facsimile machine). Mail client 305, mail server 308 and mail recipient 310 may use any electronic mail protocol, including but not limited to, the SMTP and POP3 mail protocols.

UI 301 may include one or more displays with options for use in printing output to printer 306 such as a specified portion of application data (e.g., all, one or more pages or range of pages), paper orientation, size and tray, print resolution, number of copies, etc. In addition, UI 301 allows a user to specify access information (e.g., address) for web server 307 and mail server 308 and information corresponding to mail recipient 310 (e.g., electronic mail address).

In a case that a user indicates that application data is to be published on the web, file transfer client 304 provides a mechanism for transferring the output of output generator 302 to web server 307 using a transfer protocol such as FTP which uses TCP/IP as a transport protocol to provide reliable transmission. It should be apparent that other transfer mechanisms may be used with the present invention.

Generally, file transfer client 304 establishes a connection with web server 307, output is sent to web server 307 and the connection is terminated. Using FTP, file transfer client 304 logs onto web server 307 using login information supplied by the user. The computing system that is executing driver 300 (e.g., computer 1) is the FTP client and web server 307 acts as the FTP server each of which is executing a data transfer process to manage the data transfer and a protocol interpreter to control the connection (e.g., connection login and termination).

As the FTP client, file transfer client 304 sends FTP commands to web server 307 including an "Open" command to establish a connection, "User" and "Pass" commands to supply user information, and a "cd" command may be used to select a directory of web server 307 to work in (e.g., a directory under which the transferred data is to be stored). The "Put" and "Mput" commands allows file transfer client 304 to copy a file or multiple files (respectively) to web server 307, "Get" and "Mget" commands copy files to file transfer client 304 from web server 307, and "Quit" and "Close" commands for ending an FTP session. As an FTP server, web server 307 responds to commands issued by file transfer client 304 using FTP reply codes that indicate the status (e.g., positive or negative) of command processing.

Figure 4:
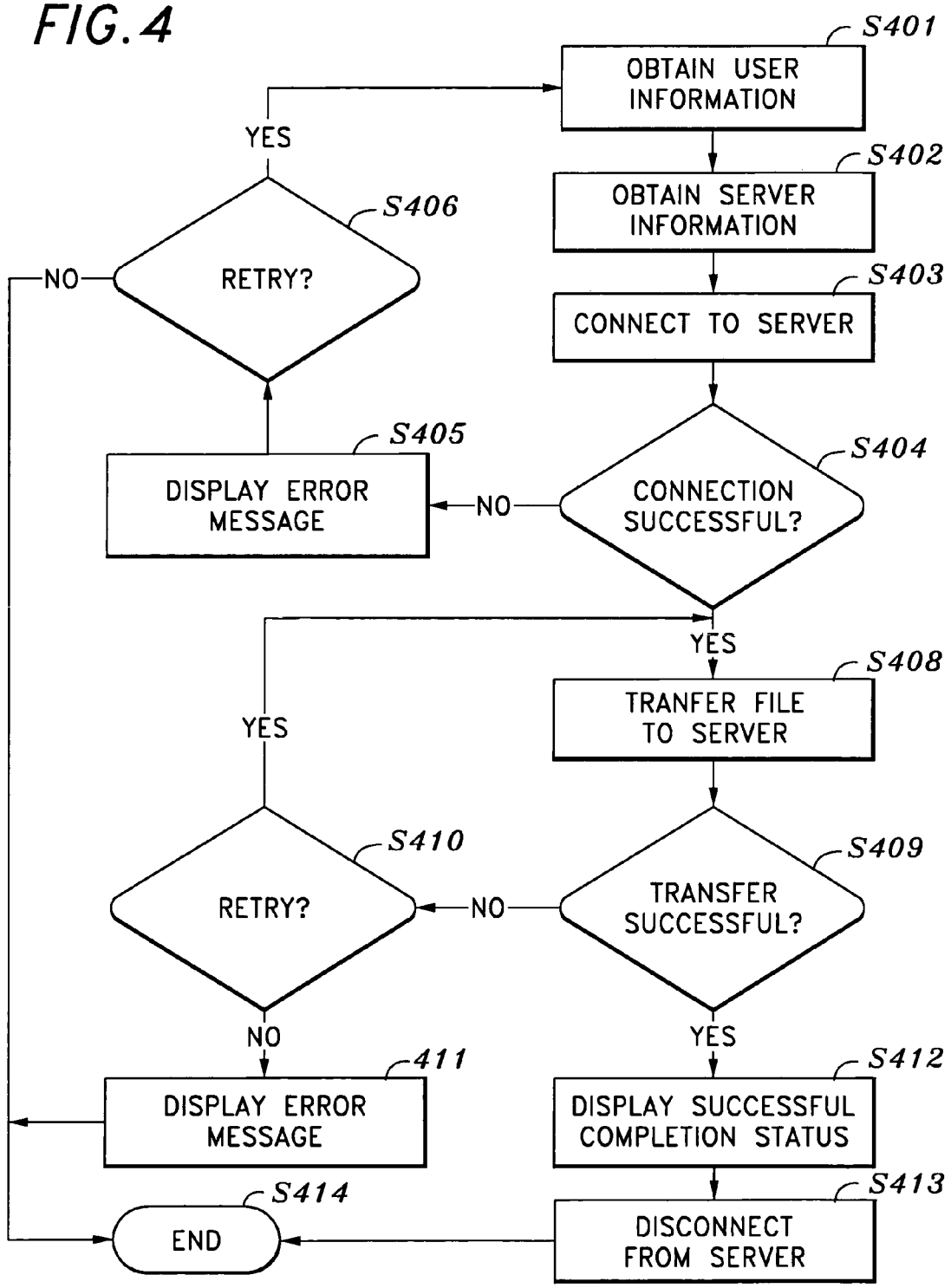
FIG. 4 illustrates a flow diagram of process steps to process a web publishing file transfer operation request according to the present invention.

FIG. 4 illustrates a flow diagram of process steps to process a web publishing file transfer operation request according to the present invention.

At step S401, user information, such as user ID and password, is obtained. The user information may be obtained from input received from the user via UI 301 or from a repository (or other storage) that contains information defaults associated with the user. At step S402, information, such as addressing and connection information, is obtained from UI 301 input or previously stored defaults, for example.

At step S403, a connection is made with the server (e.g., web server 307) using the user login information obtained in step S401 and the server connection information obtained in step S402. At step S404, a determination is made whether the connection attempt was successful. If not, processing continues at step S405 to display an error message (e.g., in UI 301) and processing continues at step S406 to determine whether another connection attempt is to be made. The determination may be based on user input and/or the number of attempts already made, for example. If another connection attempt is to be made, processing continues at step S401 with the same or different user and/or server information. If no additional connection attempts are to be made, processing ends at S414.

If it is determined, at S404, that the connection attempt was successful, processing continues at step S408 to transfer the application data to web server 307. At step S409, a determination is made whether the transfer was successfully completed. If not, processing continues at step S410 to determine whether or not another attempt is to be made. Such a determination may be made based on user specification and/or the number of previous attempts, for example. If it is determined that no further attempts are to be made, processing continues at step S411 to display an error message and processing ends at step S414. If another attempt is to be made, processing continues at step S408 to transfer the application data to web server 307.

If it is determined, at step S409, that the transfer completed successfully, processing continues at step S412 to display a message to the user. At step S413 the connection to web server 307 is terminated and processing ends at step S414.

In a case that a user indicates that application data is to be electronically mailed via the web, mail client 305 provides a mechanism for mailing the output of output generator 302 to mail server 307 using a electronic mail protocol such as SMTP which, like FTP, uses TCP/IP as a transport protocol to provide reliable transmission. It should be apparent that other electronic mail mechanisms may be used with the present invention including, but not limited to, Post Office Protocol (POP, or POP3) and Internet Message Access Protocol (IMAP or IMAP4). In addition, protocol extensions such as the Multipurpose Internet Mail Extensions (MIME), SMTP Service Extensions and/or SVG extensions may be used with, as an extension to, an electronic mail mechanism to encode additional data formats (e.g., encoding text and binary data as 7-bit ASCII data) within an electronic mail.

Like the file transfer mechanism of the present invention, a connection is established with a server (e.g., mail server 308), formatted output is sent to mail server 308 along with recipient (or destination) information and the connection is terminated.

More particularly, with respect to SMTP, mail client 305 establishes a TCP connection with mail server 308 and waits for a "service available" or "service unavailable" message from mail server 308. If a "service available" message is received, mail client 305 and mail server 308 exchange domain name information so that each may verify the connection (i.e., that the connection is between the desired sender or receiver). A "Mail" command initiates a mail transaction and may define a return path for error messages.

Once all of the destination (or recipient) information is transmitted, mail client 305 sends a "Data" command to notify mail server 308 that contents of the mail message are to follow. A "Quit" command ends the connection, a "Turn" command signals mail server 308 that mail client 305 is ready to receive messages, and a "Mail" command may be used to send another message.

Figure 5:
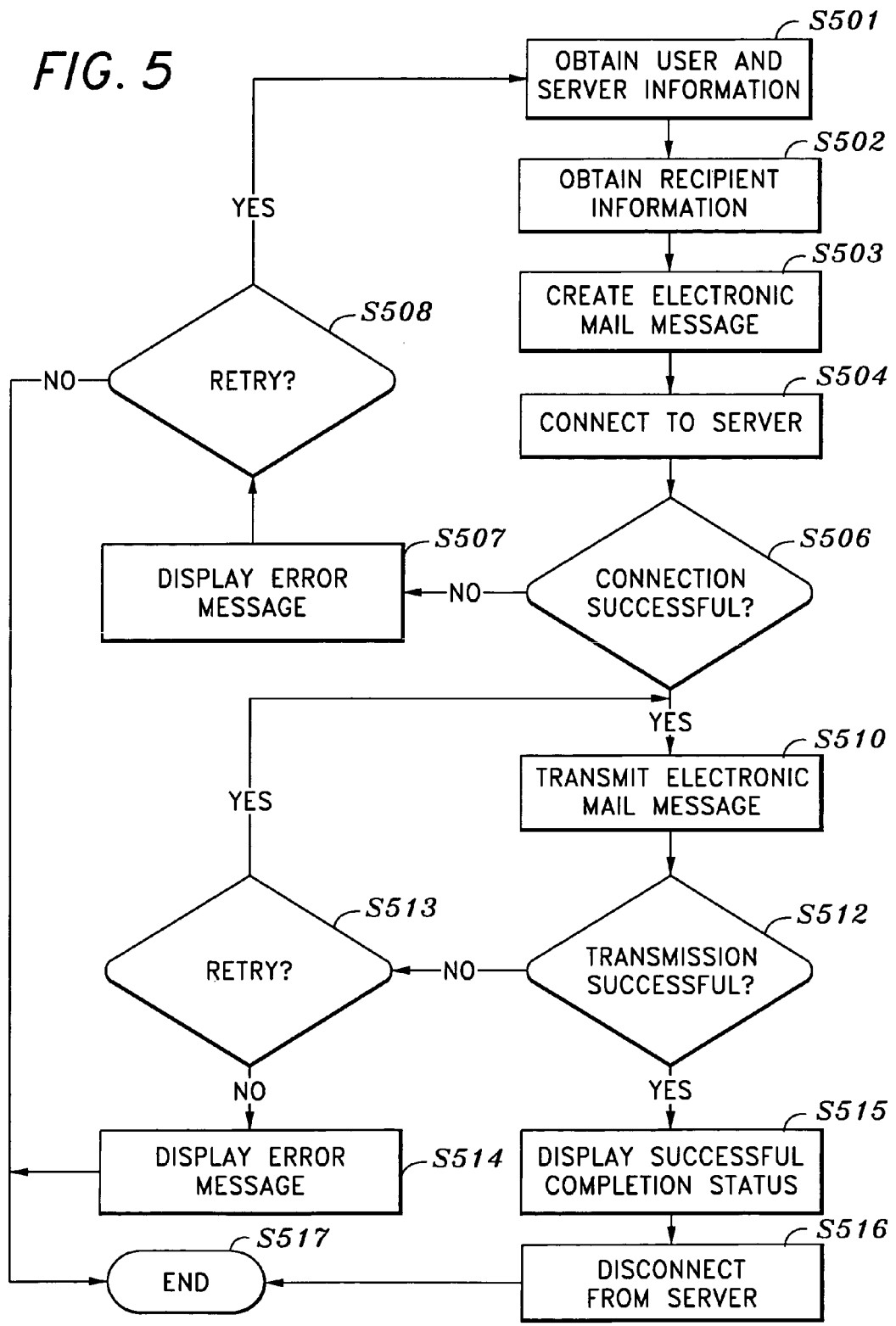
FIG. 5 illustrates a flow diagram of process steps to process an electronic mail request according to the present invention.

FIG. 5 illustrates a flow diagram of process steps to process an electronic mail request according to the present invention.

At step S501, user information, such as user ID and password, is obtained. The user information may be obtained from input received from the user via UI 301 or from a repository (or other storage) that contains information defaults associated with the user. Server information, such as addressing and connection information, is obtained from UI 301 input or previously stored defaults, for example, is also obtained at step S501. At step S502, electronic mail recipient information (e.g., email address) is obtained for each recipient. At step S503, the electronic mail message is created that contains the output.

At step S504, a connection is made with the server (e.g., mail server 308) using the user login information obtained in step S501 and the server connection information obtained in step S502. At step S506, a determination is made whether the connection attempt was successful. If not, processing continues at step S507 to display an error message (e.g., in UI 301) and processing continues at step S508 to determine whether another connection attempt is to be made. The determination may be based on user input and/or the number of attempts already made, for example. If another connection attempt is to be made, processing continues at step S501 with the same or different user, recipient and/or server information. If no additional connection attempts are to be made, processing ends at S517.

If it is determined, at S506, that the connection attempt was successful, processing continues at step S510 to transmit the electronic mail message to mail server 308. At step S512, a determination is made whether the transmission was successfully completed. If not, processing continues at step S513 to determine whether or not another attempt is to be made. Such a determination may be made based on user specification and/or the number of previous attempts, for example. If it is determined that no further attempts are to be made, processing continues at step S514 to display an error message and processing ends at step S517. If another attempt is to be made, processing continues at step S513 to re-transmit the electronic mail message to mail server 308.

If it is determined, at step S512, that the transmission completed successfully, processing continues at step S515 to display a message to the user. At step S516 the connection to mail server 308 is terminated and processing ends at step S517.

Figure 6A:
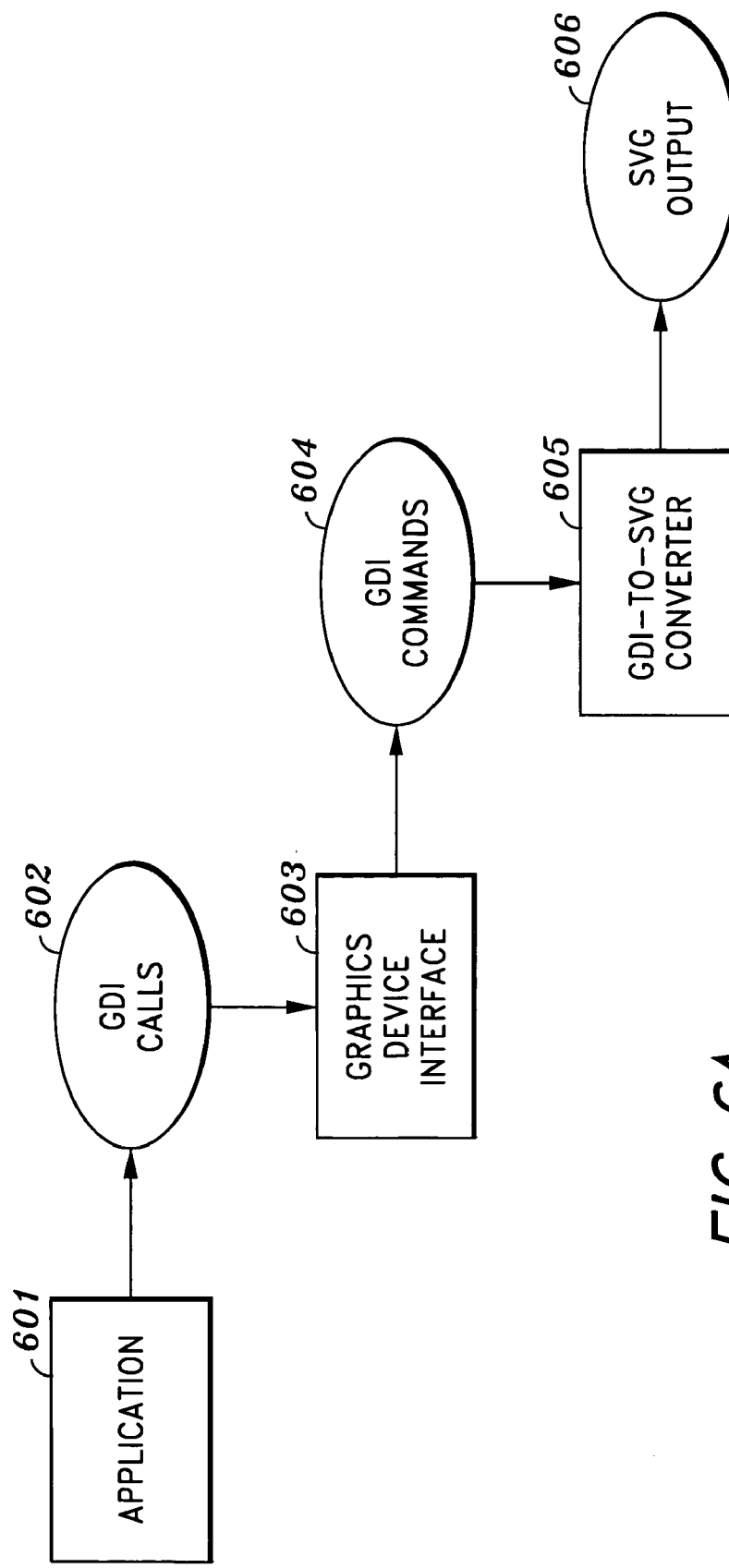
FIG. 6A provides a data flow overview in a case that GDI commands are converted to SVG format output according to the present invention.

As discussed above, in one aspect of the present invention, the output of output generator 302 generates output that conforms to a standardized markup language such as the SVG format. FIG. 6A provides a data flow overview in a case that GDI commands are converted to SVG format output according to the present invention. The data flow depicted in FIG. 6A may be used in combination with print driver 300 or any other print driver (e.g., a print driver that generates a page description language for use in printing by a printer).

Application 601 executes within a windows environment and allows a user to manipulate application data. Examples of application 601 include, but are not limited to, word processor, spreadsheet, database, browser, electronic mail and graphics applications. In response to a request to output application data 602, application 601 in operation with the program code provided in the windows environment including GDI 603 generates GDI commands 604.

That is, when application 601 receives a request to print, for example, it makes a call to one or more GDI commands (or functions) and sends GDI 603 parameters for an object that is to be created (e.g., text, line, circle, etc.). GDI 603 in turn "draws" the object by sending GDI commands to an appropriate driver (e.g., print driver 300). Thus, in response to GDI function calls 602 received from application 601, GDI 603 sends GDI commands 604 to a output generator such as GDI-to-SVG converter 605, for example, to generate converted output such as SVG output 606.

In one aspect of the invention, GDI-to-SVG converter 605 receives the GDI commands directly from GDI 603. Alternatively, an intermediate layer may be placed between GDI 603 and GDI-to-SVG converter 605. Such an intermediate layer is optional and is not required for the present invention, such a layer may be used to centralize the interpretation of GDI commands 604 received from GDI 603 thereby simplifying instances of output generator 302.

Figure 6B:
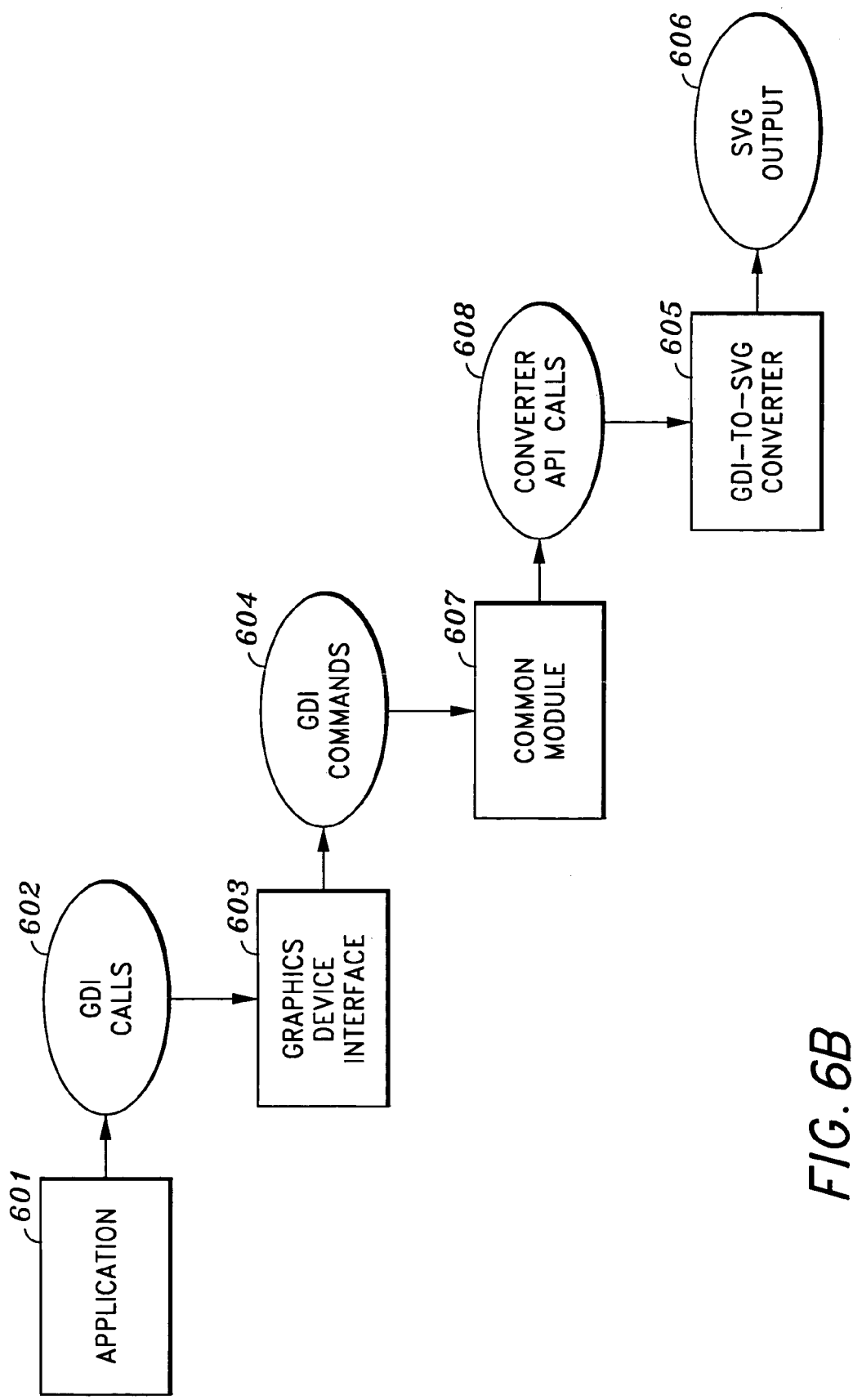
FIG. 6B provides the data flow of FIG. 6A modified to include a common core layer positioned between a graphics device interface (GDI) and a GDI-to-SVG converter according to an embodiment of the present invention.

FIG. 6B provides the data flow of FIG. 6A modified to include a common core layer positioned between GDI 603 and GDI-to-SVG converter 605 according to an embodiment of the present invention.

As discussed above, application 601 makes GDI calls 602 to GDI 603 which responds by issuing GDI commands 604. Common module 607 converts GDI commands 604 to converter API calls 608 that specify parametric data used by a converter such as GDI-to-SVG converter 605 to generate SVG output 606.

The SVG standard defines graphical elements such as path, text, and shape (or simple path) elements. Examples of basic shapes provided in the SVG standard include rectangle, circle, ellipse, line, polyline and polygon. Converter API calls 608 include the following functional groups: line attributes, line types, pen styles, brush styles, background mode and raster operation, clipping, primitive figures, path, text and bitmap.

Generally, the line attributes of converter API calls 608 may be mapped to SVG properties. The following table illustrates a mapping according to an embodiment of the present invention:

| Line Attribute | SVG Property |
| --- | --- |
| LineJoin | stroke_linejoin |
| LineCap | stroke_linecap |
| LineMiterLimit | stroke_miterlimit |
| LineWidth | stroke_width |

The stroke_linejoin property specifies a shape (e.g., miter, round or bevel) that is used at the corners of paths (or other vector shapes) when they are stroked. Segments of a path, also be referred to as subpaths, remain open until the starting point of the beginning segment of a path is joined with the ending point. The stroke_linecap property indicates the shape to be used at an open (or unclosed) subpath when it is stroked.

The stroke_width property expresses a width of the stroke of a shape. If a percentage is used, the <width> is expressed as a percentage of the current viewport (or region in which SVG output is rendered). A zero value causes no stroke to be painted. A negative value is an error.

When two lines are joined in a miter, it is possible for the miter to extend far beyond the thickness of the line stroking the path. The stroke_miterlimit property sets a limit on the ratio of the miter length to a stroke_linewidth when two line segments meet at a sharp angle and miter joins have been specified using the 'stroke-linejoin' property.

Like line attributes, line types specified in converter API calls 608 may also be mapped to SVG properties. The following table illustrates a mapping according to an embodiment of the present invention:

| Line Types | SVG Property |
| --- | --- |
| LineTypeSOLID | stroke_dasharray:none |
| LineTypeALTERNATE | stroke_dasharray |
| LineTypeCUSTOM | stroke_dasharray and stroke_dashoffset |

The 'stroke-dasharray' property controls the pattern of dashes and gaps used to stroke paths and contains a list of comma-separated (with optional white space) numbers that specify the lengths of alternating dashes and gaps in user units. If an odd number of values is provided, then the list of values is repeated to yield an even number of values. Thus, stroke-dasharray: 5 3 2 is equivalent to stroke-dasharray: 5 3 2 5 3 2. A value of "none" indicates that no dashing is used, and if stroked, the line is drawn solid. The dasharray may be include a percentage specification that represents a distance as a percentage of the current viewport. A negative <length> value is an error. If the sum of the <length>'s is zero, then the stroke is rendered as if a value of none were specified.

The 'stroke-dashoffset' property specifies the distance into the dash pattern to start the dash. If a percentage is used, the <width> is expressed as a percentage of the current viewport. Values can be negative.

| Pen/Brush Styles | SVG Property |
| --- | --- |
| PenStyleSOLIDCOLOR | stroke:color designation |
| PenStyleHATCH | stroke:url (#patID) |
| PenStyleBITMAP | stroke:url (#patID) |
| BrushStyleSOLIDCOLOR | fill:color designation |
| BrushStyleHATCH | fill:url (#patID) |
| BrushStyleBITMAP | fill:url (#ID) |

Pen styles map to the SVG stroke style property. Where a color is specified as in PenStyleSOLIDCOLOR, the SVG stroke property is set to the specified color. Similarly, a brush style specification indicating a color is mapped to an SVG fill style property. In the case of BrushStyleSOLIDCOLOR, the fill property is set to the color specified therein.

The SVG stroke and fill properties may be used to set a hatch pattern specified using PenStyleHATCH and BrushStyleHATCH (respectively). The "#patID" represents a unique SVG pointer to an SVG pattern that matches the corresponding GDI hatch pattern. The SVG pattern may be composed of SVG vector graphics elements and is not limited to an image. The size of the SVG pattern is preferably proportional to the GDI pattern, which are typically 8×8 bitmaps targeted for a 96 dpi device. Thus, the GDI hatch pattern is 1/12 of an inch wide and high. For example, a 600 dpi printer should have an SVG pattern size of 50×50 to match the GDI display hatch pattern.

A bitmap specified in a PenStyleBITMAP or BrushStyleBITMAP is mapped to SVG stroke and fill properties (respectively). The BITMAP is defined as an SVG pattern inside an SVG defs element with a unique ID (#patID) which is referenced in the SVG statement.

A background mode specified in a SetBkMode function may be set using the SVG fill property. Where an OPAQUE value is specified as the background mode, the graphic object is to be filled with the background color before stroking or filling it, and the current background color is used with the SVG fill element.

The SVG clipPath element and clipPath style property may be used for clipping. A clipPath element is defined in a defs element with a unique identifier that can then be referenced using the clipPath property. For example, the clipPath property may be used inside a "g" container element of SVG as follows:

<g style="clip-path:URL(#clippath1)"> where "#clippath1" is the unique identifier of the clipPath element defined in the defs element.

The clipPath element may be defined to be the size of a page where GDI clipping is turned off, the size of a requested clipping rectangle, or a requested clipping path, for example.

GDI draw components including DrawLine, DrawRect, DrawPolygon, and BezierRelPath may be mapped to an SVG path element. SVG paths represent the outline of a shape which can be filled, stroked, used as a clipping path, or any combination of the three. Paths represent the geometry of the outline of an object or a shape, defined in terms of coordinates (either absolute or relative) in which to trace from a current point. The coordinates are specified in a path data portion of the path element which are also referred to as path commands and include "moveto" (set a new current point), "lineto" (draw a straight line), curveto (draw a curve using a cubic Bézier), arc (elliptical or circular arc) and closepath (close the current shape by drawing a line to the last moveto) elements. A compound path (i.e., a path with subpaths, each consisting of a single moveto followed by one or more line or curve operations) may be defined. The coordinates that are specified by the path commands may be expressed in absolute or relative values.

With respect to text, a font specification in GDI is mapped to an SVG font, where possible. If there is not a one-to-one matching between fonts, a font-matching mechanism may be used to identify an alternative font. A font name is set using the SVG font-family property, a font size is set in the SVG font-size property, a color is set using the SVG fill property with a color designation.

An output string defined in a GDI DEVOutputString may be defined by a character angle, starting location and the string itself. An output string is mapped to an SVG text element. Where a zero character angle and zero positioning is specified, the output string is mapped to an SVG text angle. In a case where a nonzero character angle and/or nonzero positioning is specified, an SVG tspan element is used. Alternatively, each character of the string may be mapped to an SVG text element. The character angle may be specified using an SVG rotate attribute. The rotate is performed after the positioning command and is undone before the next character.

A bitmap specified in the GDI output may be mapped to an SVG image element that contains a reference to a file that contains the raster data. Where the raster data is not in a format that is supportable by SVG, it can be converted to a format that is supported (e.g., JPEG and PNG).

The present invention uses the SVG 'g' element to optimize GDI parameter changes (e.g., a change in a style or other attribute such as color, stroke width, clipping, etc.) thereby resulting in more efficient SVG output. GDI parameter changes are cached and a determination is made whether a new SVG "g" element is needed to specify a changed parameter that is specified in the GDI input.

The SVG "g" is used to group and name collections of drawing elements. If several drawing elements share similar attributes, they can be collected together using a 'g' element. A group of drawing elements, as well as individual objects, can be given a name using the id attribute. Named groups may be used to define re-usable objects.

While it is possible to generate a new "g" element whenever a GDI parameter, problems arise when changes in GDI parameters result in several nested levels of "g" elements. It may be possible that an SVG interpreter may not be able to process the a number of nested "g" elements. Therefore, the present invention caches GDI style commands (or parameter changes) and creates new non-nested SVG "g" elements as needed (e.g., if a GDI parameter change impacts a SVG element to be nested in a "g" element). When a new "g" element is needed, the last "g" element is terminated, and those SVG style attributes with non-default SVG values are generated in the new "g" element.

In another aspect of the present invention, the generation of SVG path commands in response to GDI path commands is optimized. For example, the present invention makes use of compound path definitions in SVG by caching GDI path commands and generating a single SVG path command when a GDI paintPath command is detected.

In yet another aspect of the invention, the need for floating point operations to convert absolute coordinate GDI output to SVG coordinate values is avoided using the SVG viewBox attribute in conjunction with the SVG "svg" element. Since SVG is a vector graphics language, any resolution may be used which is not taken into account in GDI commands 604. The SVG coordinate values that are generated by the present invention take into account a desired resolution. Further, absolute coordinate value GDI output may be converted to SVG dimensions for a desired resolution without the need for floating point operations. The following provides an example of a dimension definition that may be used to define the physical dimensions of the output medium and the desired resolution:

<svg width="8.5 in" height="11 in" viewBox 0 0 5100 6600

</svg>

In the above example, the physical dimensions of the medium is defined, in inches, as being 8.5 by 11 (the same as a sheet of letter-size paper). The viewBox attribute is used to define an offset which is expressed as a minimum "x" (i.e., "0") and minimum "y" (i.e., "0") position, and a width and height in pixels based on a 600 dpi resolution. The viewBox width is determined by multiplying the physical width designation by the resolution (i.e., 8.5 times 600, or 5100). Similarly, the physical height is multiplied by the resolution to determine the viewBox height (i.e., 11 times 600, or 6600).

As a result of this definition, absolute coordinates such as "1" inch and "2" inches values may be expressed relative to a desired resolution and output medium (i.e., "600" and "1200", respectively).

In yet another aspect of the invention, image data may be embedded in the SVG output. Various criteria may be used such as user specification, image data size, etc. to determine whether to embed all or some of the image data in the SVG output. Some or all of the image data reference in SVG output may be embedded.

A universal resource locator may be expressed in SVG to specify the location of an image file that is not embedded into the output. Alternatively, the present invention adapts a mechanism described in RFC 2397, which is incorporated herein by reference, for use with the SVG output generation capability of the present invention to include data items (e.g., image data) as immediate data within the SVG output.

A URI (Universal Resource Indicator) according to this scheme is specified as follows:

data:[<mediatype>][;base64],<data> where <mediatype> defines the Internet media type specification (e.g., image), and "base64" indicates that the data is encoded as base64. If "base64" is not indicated, ASCII encoding is used to represent the embedded data.

The following provides an example of a data URL embedding PNG data in SVG output:

xlink:href=data:image/png;base64, data which uses the XML Linking Language (XLink) to use the data URL mechanism. The data URL statement follows and defines the data as PNG image data in base64, and the data follows thereafter.

Figure 7:
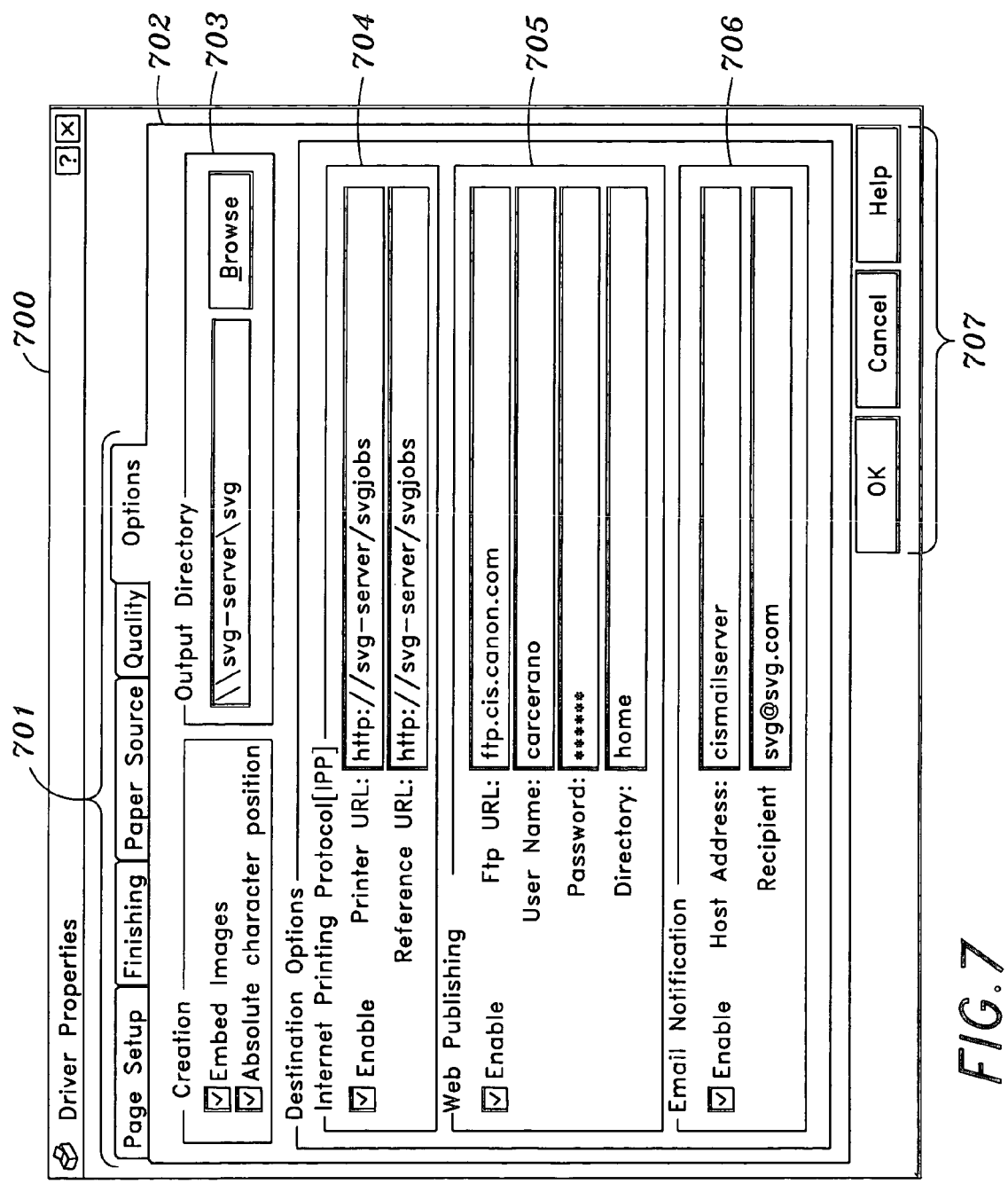
FIG. 7 provides an example of a user interface for use in setting print driver properties according to the present invention.

FIG. 7 provides an example of a user interface for use in setting print driver properties according to the present invention. Display 700 includes property pages having a corresponding one of tabs 701, and currently displays an "Options" page 702 that corresponds to the "Options" tab. Page 702 includes sections 703, 704, 705 and 706. Display 700 further includes buttons 707 which allow the user to exit and save any changes made (using the "OK" button), exit without saving any changes (via the "Cancel" button), and/or obtain help (via the "Help" button).

Section 703 allows a user to specify properties that are used in generating the print driver 300 output according to the present invention. For example, section 703 allows a user to specify whether or not images are embedded in the output and/or whether absolute or relative character positioning is used. In addition, an output directory in which the generated output is saved may be specified in section 703.

Sections 704 through 706 allow a user to specify properties used in printing, publishing or electronically mailing print driver 300 output, respectively. The user may elect to enable or disable some or all of the multifunction features of print driver 300. In addition, with reference to printing, a user may take advantage of the Internet Printing Protocol to send a print job to printer specified by a universal resource locator (URL) specification. A reference URL may be used to identify a location by which a reference (e.g., a reference to an image) in print driver 300 output is resolved.

In section 705, a user may specify a URL for web server 307, a directory on web server 307, and user information. The user information includes a username and password combination that is used in connecting to web server 307.

Email properties may be set in section 706 and include an address of mail server 308 and one or more recipients of the email output generated by print driver 300.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

The invention claimed is:

1. A print driver executable on a user's personal computer responsive to a selection of a print option from any application program, the print driver being stored on a memory medium readable by the user's personal computer, the print driver comprising:

computer-executable code configured to receive output from an application program; and computer-executable code configured to generate print output from the application program output, the print output conforming to a scalable vector graphics (SVG) language, which is a standardized device independent output format, wherein the computer-executable code configured to generate the print output further comprises computer-executable code configured to convert absolute coordinate values to SVG dimensions which indicate physical lengths using a width and height viewbox designation in the print output in accordance with physical dimensions of an output medium and a desired resolution.

2. A print driver according to claim 1, wherein the application program output comprises Graphic Device Interface (GDI) commands.

3. A print driver according to claim 1, wherein the scalable vector graphics (SVG) language permits a hierarchy of elements, wherein the computer-executable code configured to generate print output further comprises:

computer-executable code configured to track a state change associated with a hierarchical level defined in the application program output and determine when to include the state change in the print output.

4. A print driver according to claim 1, wherein the computer-executable code configured to generate print output further comprises:

computer-executable code configured to cache at least one path element in the application program output and generate a corresponding path element in the print output when a paint path element is encountered in the application program output.

5. A print driver according to claim 1, wherein the computer-executable code configured to generate print output further comprises:

computer-executable code configured to embed image data within an element definition of the print output.

6. A method executable by a print driver executing on a user's personal computer and responsive to a selection of a print option from any application program, the method comprising:

a receiving step to receive output from an application program; and a generating step to generate print output from the application program output, the print output conforming to a scalable vector graphics (SVG) language, which is a standardized device independent output format, wherein the computer-executable code configured to generate the print output further comprises computer-executable code configured to convert absolute coordinate values to SVG dimensions which indicate physical lengths using a width and height viewbox designation in the print output in accordance physical dimensions of an output medium and a desired resolution.

7. A method according to claim 6, wherein the application program output comprises Graphic Device Interface (GDI) commands.

8. A method according to claim 6, wherein the scalable vector graphics (SVG) language permits a hierarchy of elements, wherein generating print output further comprises:
tracking a state change associated with a hierarchical level defined in the application program output and determine when to include the state change in the print output.

9. A method according to claim 6, wherein generating print output further comprises:
storing at least one path element in the application program output and generating a corresponding path element in the print output when a paint path element is encountered in the application program output.

10. A method according to claim 6, wherein generating print output further comprises;
converting absolute coordinates to physical lengths using a width and height viewbox designation in the print output.

11. A method according to claim 6, wherein generating print output further comprises:
embedding image data within an element definition of the print output.

12. A computer-readable memory medium in which computer-executable process steps are stored, the process steps for execution by a print driver and responsive to a selection of a print option from an application program, the process steps comprising:
a receiving step to receive output from an application program; and
a generating step to generate print output from the application program output, the print output conforming to a scalable vector graphics (SVG) language, which is a standardized device independent output format,
wherein the computer-executable code configured to generate the print output further comprises computer-executable code configured to convert absolute coordinate values to SVG dimensions which indicate physical lengths using a width and height viewbox designation in the print output in accordance with physical dimensions of an output medium and a desired resolution.

13. A computer-readable memory medium according to claim 12, wherein the application program output comprises Graphic Device Interface (GDI) commands.

14. A computer-readable memory medium according to claim 12, wherein the scalable vector graphics (SVG) language permits a hierarchy of elements, wherein the generating step to generate print output further comprises:
a tracking step to track a state change associated with a hierarchical level defined in the application program output and determine when to include the state change in the print output.

15. A computer-readable memory medium according to claim 12, wherein the generating step to generate print output further comprises:
a storing step to store at least one path element in the application program output and generating a corresponding path element in the print output when a paint path element is encountered in the application program output.

16. A computer-readable memory medium according to claim 12, wherein the generating step to generate print output further comprises:
a converting step to convert absolute coordinates to physical lengths using a width and height viewbox designation in the print output.

17. A computer-readable memory medium according to claim 12, wherein the generating step to generate print output further comprises:
an embedding step to embed image data within an element definition of the print output.

18. A print driver executable on a user's personal computer responsive to a selection of a print option from any application program, the print driver being stored on a memory medium readable by the user's personal computer, the print driver comprising:
computer-executable code configured to receive output from an application program; and
computer-executable code configured to generate print output from the application program output, the print output conforming to a scalable vector graphics (SVG) language, which is a standardized device independent output format,
wherein the computer-executable code configured to generate the print output further comprises computer-executable code configured to convert absolute coordinate values to SVG dimensions in accordance with physical dimensions of an output medium and a desired resolution, and computer-executable code configured to cache at least one path element in the application program output and generate a corresponding path element in the print output when a paint path element is encountered in the application program output.

19. A print driver according to claim 18, wherein the application program output comprises Graphic Device Interface (GDI) commands.

20. A print driver according to claim 18, wherein the scalable vector graphics (SVG) language permits a hierarchy of elements, wherein the computer-executable code configured to generate print output further comprises:
computer-executable code configured to track a state change associated with a hierarchical level defined in the application program output and determine when to include the state change in the print output.

21. A print driver according to claim 18, wherein the computer-executable code configured to generate print output further comprises:
computer-executable code configured to embed image data with an element definition of the print output.

22. A method executable by a print driver executing on a user's personal computer and responsive to a selection of a print option from any application program, the method comprising:
a receiving step to receive output from an application program; and
a generating step to generate print output from the application program output, the print output conforming to a scalable vector graphics (SVG) language, which is a standardized device independent output format,
wherein the computer-executable code configured to generate the print output further comprises computer-executable code configured to convert absolute coordinate values to SVG dimensions in accordance with physical dimensions of an output medium and a desired resolution, and computer-executable code configured to cache at least one path element in the application program output and generate a corresponding path element in the print output when a paint path element is encountered in the application program output.

* * * * *